US012735293B2

(12) United States Patent
Therrien et al.

(10) Patent No.: US 12,735,293 B2
(45) Date of Patent: Sep. 15, 2026

(54) CABLE SPOOLER FOR A MOBILE ROBOT

(71) Applicant: Teledyne FLIR Defense, Inc., Stillwater, OK (US)

(72) Inventors: Richard J. Therrien, Chelmsford, MA (US); Annan M. Mozeika, Chelmsford, MA (US); Jordan D. Jesiolowski, Chelmsford, MA (US); Adam Crowell, Chelmsford, MA (US)

(73) Assignee: Teledyne FLIR Defense, Inc., Stillwater, OK (US)

( * ) Notice: Subject to any disclaimer, the term of this patent is extended or adjusted under 35 U.S.C. 154(b) by 1039 days.

(21) Appl. No.: 17/875,137

(22) Filed: Jul. 27, 2022

(65) Prior Publication Data

US 2022/0363509 A1 Nov. 17, 2022

Related U.S. Application Data

(63) Continuation of application No. PCT/US2021/015914, filed on Jan. 29, 2021.

(Continued)

(51) Int. Cl.
*B65H 49/26* (2006.01)
*B25J 13/00* (2006.01)

(Continued)

(52) U.S. Cl.
CPC .............. *B65H 49/26* (2013.01); *B25J 13/00* (2013.01); *B25J 19/00* (2013.01); *B65H 49/324* (2013.01);

(Continued)

(58) Field of Classification Search
CPC ...... B65H 49/26; B65H 49/324; B65H 79/00; B65H 2701/34; B65H 75/4402;

(Continued)

(56) References Cited

U.S. PATENT DOCUMENTS 4,460,826 A * 7/1984 Pryor ..................... B25J 19/025
385/119
4,666,102 A 5/1987 Colbaugh et al.

(Continued)

FOREIGN PATENT DOCUMENTS

CN 107139159 A 9/2017
EP 0416196 A1 * 3/1991 ............... A61B 6/56

OTHER PUBLICATIONS

Mcgarey et al., "System Design of a Tethered Robotic Explorer (TRex) for 3D Mapping of Steep Terrain and Harsh Environments," Mar. 16, 2016, vol. 113, International Symposium on Field and Service Robotics, Springer Tracts in Advanced Robotics, https://doi.org/10.1007/978-3-319-27702-8_18.

(Continued)

*Primary Examiner* — S. Joseph Morano
*Assistant Examiner* — James William Jones
(74) *Attorney, Agent, or Firm* — Haynes and Boone, LLP

(57) ABSTRACT

Techniques are disclosed for systems and methods for providing a wired connection between a ground-based robot and a controller. A cable handling system for a robot may include a base housing, a cable cartridge removably connected to the base housing, a control cable housed at least partially within the cable cartridge, and an outfeed assembly coupled to the base housing and configured to deploy the control cable from the cable cartridge. The control cable may be deployable from the cable cartridge to maintain a wired connection between the robot and a controller. The outfeed assembly may be configured to couple to a drive mechanism of the robot such that movement of the drive mechanism deploys the control cable from the cable cartridge. The outfeed assembly may be configured to deploy the control cable from the cable cartridge regardless of the direction of movement of the drive mechanism.

20 Claims, 11 Drawing Sheets

Related U.S. Application Data

(60) Provisional application No. 62/968,567, filed on Jan. 31, 2020.

(51) Int. Cl.

| | |
|---|---|
| ***B25J 19/00*** | (2006.01) |
| ***B65H 49/32*** | (2006.01) |
| ***B65H 75/42*** | (2006.01) |
| ***B65H 75/44*** | (2006.01) |
| ***B65H 79/00*** | (2006.01) |
| ***H02G 11/02*** | (2006.01) |

(52) U.S. Cl.
CPC ......... *B65H 75/42* (2013.01); *B65H 75/4402* (2013.01); *B65H 75/446* (2013.01); *B65H 75/4497* (2013.01); *B65H 79/00* (2013.01); *H02G 11/02* (2013.01); *B65H 2701/34* (2013.01)

(58) Field of Classification Search
CPC .. B65H 75/446; B65H 75/4497; B65H 75/42; B25J 13/00; B25J 19/00; H02G 11/02
USPC ............................... 191/12.2 A, 12.2 R, 12.4
See application file for complete search history.

(56) References Cited

U.S. PATENT DOCUMENTS

| | | | | |
|---|---|---|---|---|
| 4,736,826 | A | 4/1988 | White et al. | |
| 5,007,599 | A * | 4/1991 | Forsyth | B65H 75/4489 254/377 |
| 5,551,545 | A * | 9/1996 | Gelfman | H02G 11/02 191/12.2 A |
| 7,331,436 | B1 * | 2/2008 | Pack | F41H 7/005 191/12.2 A |
| 7,546,912 | B1 | 6/2009 | Pack et al. | |
| 9,290,269 | B2 * | 3/2016 | Walker | B64U 10/60 |
| 2012/0205477 | A1 * | 8/2012 | Whitaker | B65H 75/48 242/378 |
| 2019/0366562 | A1 * | 12/2019 | Zhang | B25J 19/0041 |

OTHER PUBLICATIONS

"Mining Robots: Tethered Fiber-Optic Robot," Sep. 25, 2020, SuperDroid Robots, Sep. 25, 2020, https:/www.superdroidrobots.com/shop/custom.aspx/mining-robots/65/#Tethered_Fiber-Optic_Robot.

"Caliber T5," Dec. 22, 2021, ICOR Technology—Tactical & Security Robotics Products, https://icortechnology.com/robots/caliber-t5/.

* cited by examiner 100
114
126
122
152
172
184
188
202
124
142, 144
150
128
118
102
110
106
108
520
552
510
104
560
540
530
580
584
566
570
550
584
532
554
580
568
500
570
522
108
542

512
582

1200
1214
1202
1216
1220
1210
1212
108
100
1204

CABLE SPOOLER FOR A MOBILE ROBOT

CROSS-REFERENCE TO RELATED APPLICATION

This application is a continuation of International Patent Application No. PCT/US2021/015914 filed Jan. 29, 2021 and entitled "CABLE SPOOLER FOR A MOBILE ROBOT," which claims the benefit of and priority to U.S. Provisional Application No. 62/968,567 filed Jan. 31, 2020 and entitled "CABLE SPOOLER FOR A MOBILE ROBOT," all of which are incorporated herein by reference in their entirety.

TECHNICAL FIELD

One or more embodiments of the invention relate generally to a cable spooler for a mobile robot and more particularly, for example, to systems and methods for a cable handling system providing a wired connection between a ground-based robot and a controller.

BACKGROUND

Ground-based robots and robotic devices are often used in place of a human being to perform tasks, whether due to size or environmental considerations. Some environments are very challenging for reliable radio communications with ground-based robots, which can hinder the ability to remotely operate the ground-based robots. Thus, incorporation of a wired connection with the robot is sometimes favored in certain conditions or situations.

Use of a wired connection, however, does have its limitations. For example, the control cable can become snagged as the robot moves around corners or other obstacles. These snags, in addition to a dragging force imposed on the control cable as the robot moves, may create stress points on the control cable, which can lead to intermittent communication and/or damage of the control cable itself. The control cable can also become entangled with one or more moving parts of the robot, such as becoming wound around an axle or tangled in the drive mechanism, especially if the control cable is under tension.

Thus, there is a need in the art for systems and methods for a cable handling system that addresses the deficiencies noted above, other deficiencies known in the industry, or at least offers an alternative to current techniques.

SUMMARY

Techniques are disclosed for systems and methods for handling a communication cable associated with a ground-based robot. In accordance with one or more embodiments, a cable handling system for a robot includes a base housing, a cable cartridge removably connected to the base housing, a control cable housed at least partially within the cable cartridge, and an outfeed assembly coupled to the base housing and configured to deploy the control cable from the cable cartridge. The control cable may be deployable from the cable cartridge to maintain a wired connection between the robot and a controller. The outfeed assembly may be configured to couple to a drive mechanism of the robot such that movement of the drive mechanism deploys the control cable from the cable cartridge. The outfeed assembly may be configured to deploy the control cable from the cable cartridge regardless of the direction of movement of the drive mechanism.

In accordance with one or more embodiments, a system includes a controller, a robot controllable by the controller, and a cable handling system providing wired communication between the controller and the robot. The robot may include a drive mechanism operable to move the robot along a path. The cable handling system may include a base housing connected to the drive mechanism of the robot, a disposable cable cartridge removably connected to the base housing, a control cable housed at least partially within the cable cartridge and connected between the controller and the robot, and an outfeed assembly coupled to the base housing. The outfeed assembly may be coupled to the drive mechanism of the robot to deploy the control cable from the cable cartridge as the drive mechanism moves the robot along the path.

In accordance with one or more embodiments, a method includes connecting a cable handling system to a wheel of a robot, the cable handling system providing a wired communication between the robot and a controller. The cable handling system may include a cable cartridge, a control cable housed at least partially within the cable cartridge and connected between the controller and the robot, and an outfeed assembly for deploying the control cable from the cable cartridge. The method includes deploying a length of the control cable from the cable cartridge via the outfeed assembly as the wheel of the robot traverses across a surface. The control cable may be deployed from the cable cartridge regardless of the direction the robot wheel is rotated.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the disclosure, a cable handling system may be provided. As described herein, the cable handling system allows a wired communication between a ground robot and its controller to create a reliable connection for robust operation. For example, the cable handling system may be configured to automatically feed out or deploy a communication and/or control cable as the robot traverses across a surface or otherwise moves as directed by the controller.

The cable handling system may include many features and benefits. For example, the cable handling system may be configured to deploy a communication and/or control cable in a manner limiting the cable from dragging, snagging, and/or interfering with operation of the robot. In some embodiments, the cable handling system may be attached to a robot without the use of tools and may be sealed to limit damage from debris or fluid. The cable handling system may include one or more safety mechanisms to limit damage to the cable handling system, or portions thereof, from drops, impacts, or other damaging events. In some embodiments, the communication and/or control cable may be housed within a disposable cartridge that is replaced after each use. These and other features will be described in detail below.

Figure 1:
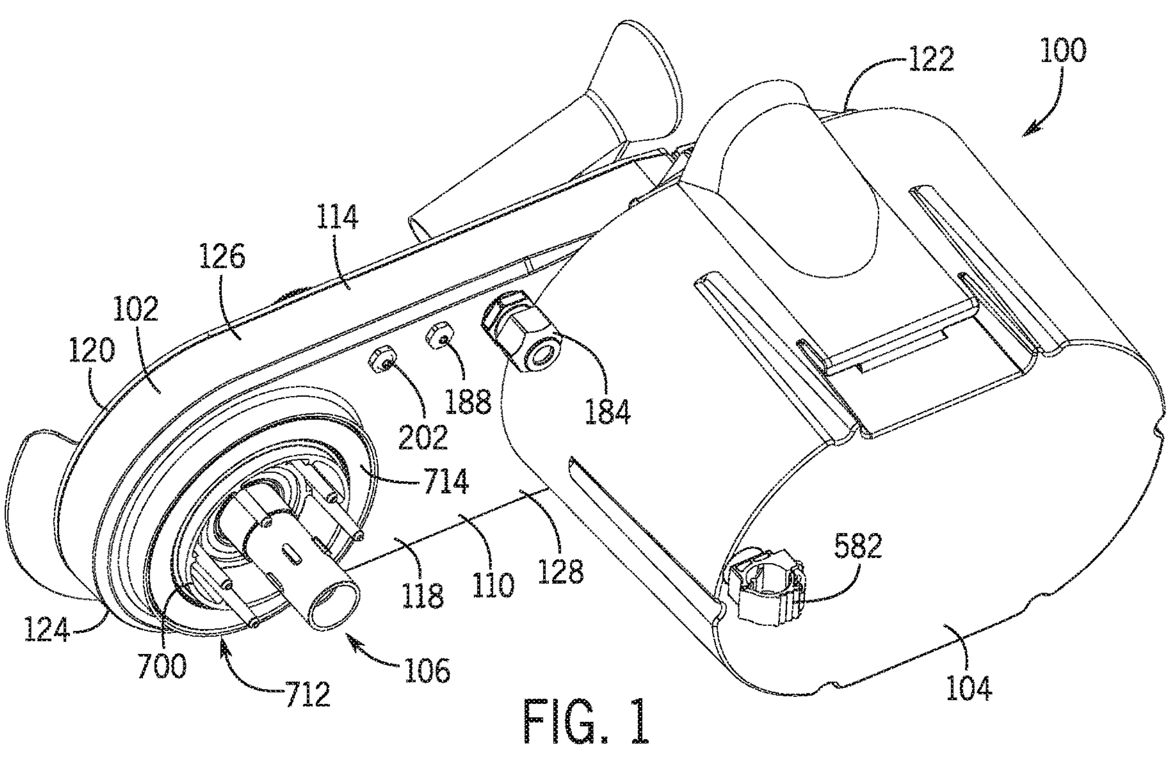
FIG. 1 illustrates a top perspective view of a cable handling system in accordance with an embodiment of the disclosure.
Figure 2:
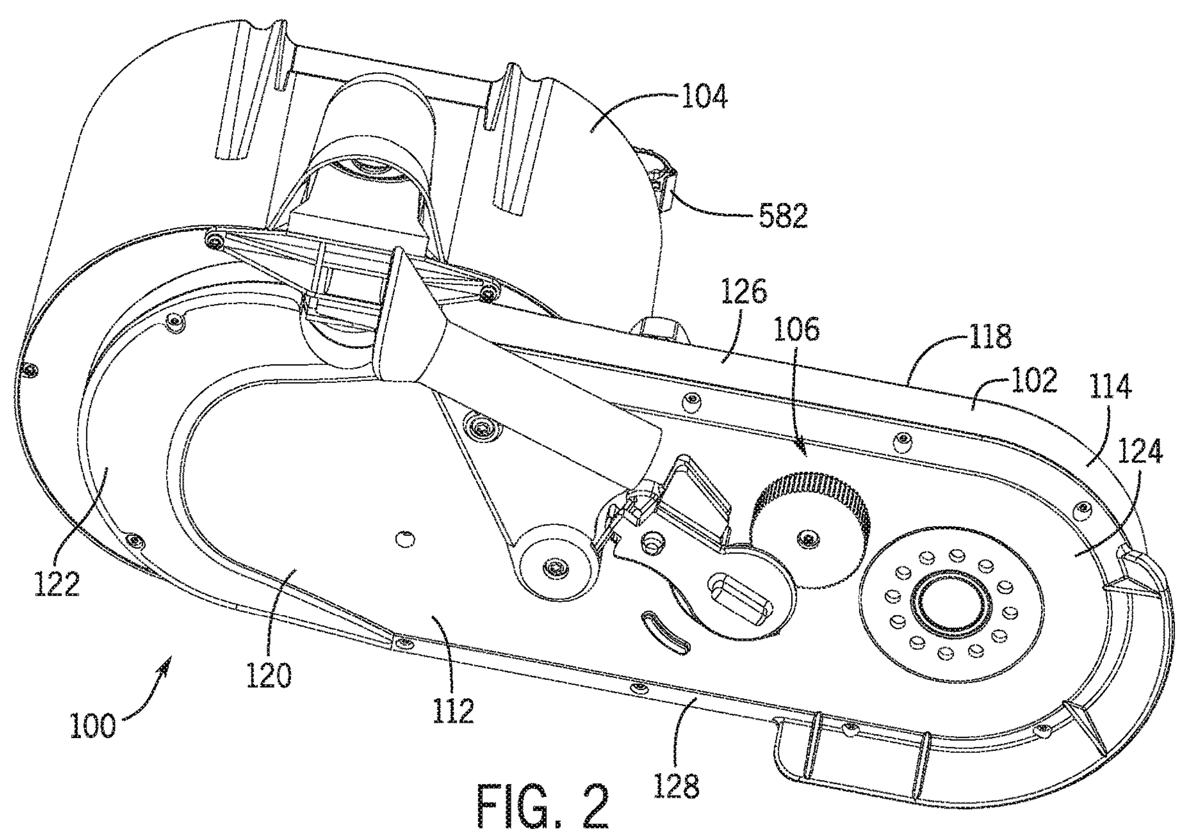
FIG. 2 illustrates a bottom perspective view of the cable handling system of FIG. 1 in accordance with an embodiment of the disclosure.
Figures 3, 5:
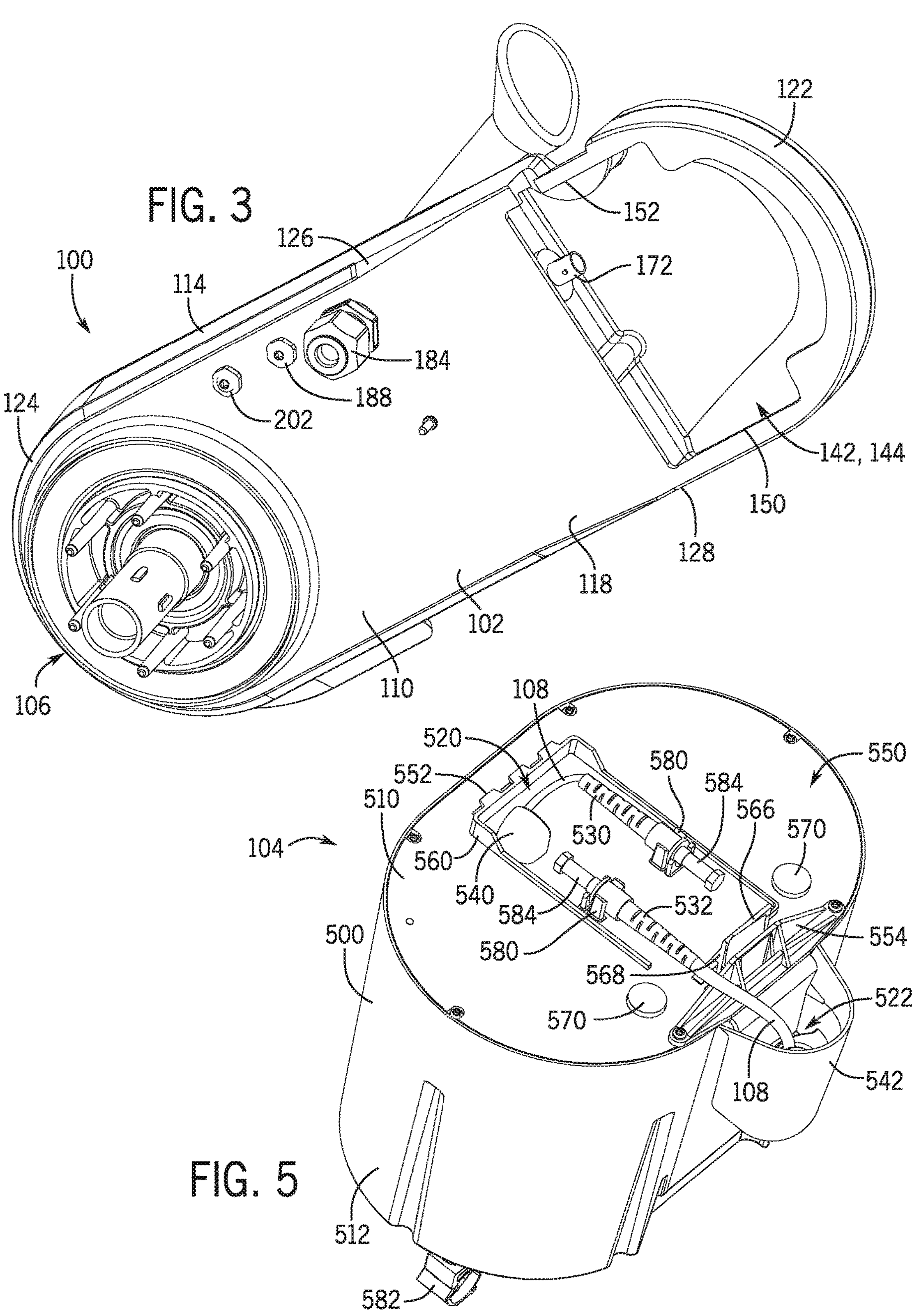
FIG. 3 illustrates a perspective view of the cable handling system of FIG. 1 with a cable cartridge removed for illustration purposes in accordance with an embodiment of the disclosure.
FIG. 5 illustrates a perspective view of a cable cartridge of the cable handling system of FIG. 1 in accordance with an embodiment of the disclosure.
Figure 4:
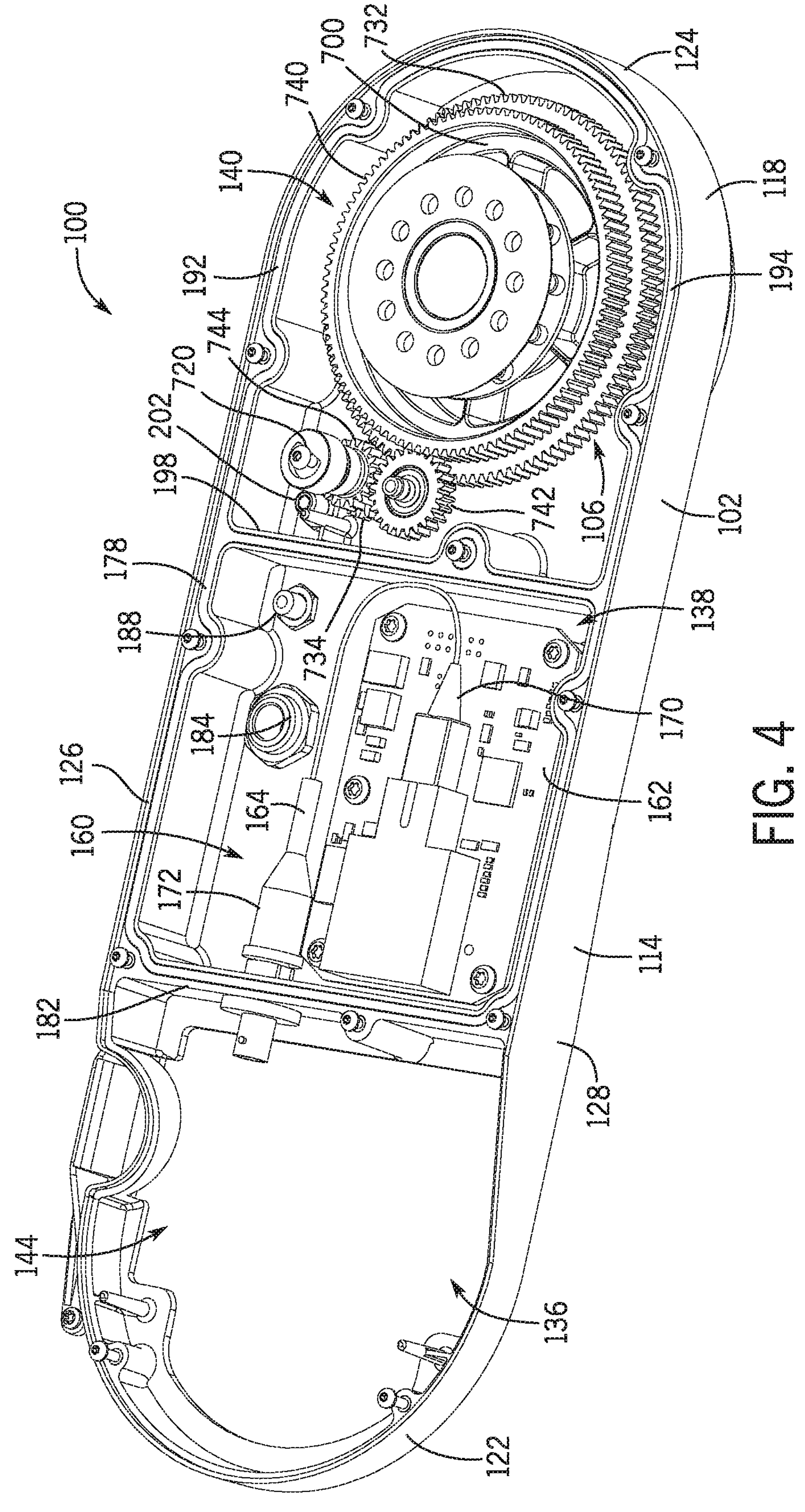
FIG. 4 illustrates a cross-sectional view of a base housing of the cable handling system of FIG. 1 in accordance with an embodiment of the disclosure.

FIG. 1 illustrates a top perspective view of a cable handling system 100 in accordance with an embodiment of the disclosure. FIG. 2 illustrates a bottom perspective view of the cable handling system 100 in accordance with an embodiment of the disclosure. FIG. 3 illustrates a perspective view of the cable handling system 100 with a cable cartridge removed for illustration purposes in accordance with an embodiment of the disclosure. FIG. 4 illustrates a cross-sectional view of a base housing of the cable handling system 100 in accordance with an embodiment of the disclosure. The cable handling system 100, which may be referred to as a cable spooler, may include a base housing 102, a cable cartridge 104 removably connected to the base housing 102, and an outfeed assembly 106 or mechanism configured to deploy a control cable 108 (see FIG. 5) from the cable cartridge 104. The base housing 102 may include a top surface 110, a bottom surface 112, and a rim 114 extending between the top surface 110 and the bottom surface 112. In some embodiments, the base housing 102 may be a two-piece housing with a first housing piece 118 secured to a second housing piece 120. Depending on the application, the base housing 102 may include an oval or elliptical shape with opposing first and second ends 122, 124 and opposing first and second sides 126, 128 extending between the first and second ends 122, 124. The first end 122 and the second end 124 may be arcuately-shaped. The first side 126 and the second side 128 may extend linearly between the first and second ends 122, 124.

In some embodiments, the base housing 102 may include many configurations integrating a plurality of components, assemblies, and/or functions together into a single unit. For example, as shown in FIGS. 3-4, the base housing 102 may include a plurality of compartments, such as a first compartment 136, a second compartment 138, and a third compartment 140 as shown, although other configurations are contemplated. The first compartment 136 may be associated with a first feature, component, or assembly of the cable handling system 100. For instance, the first compartment 136 may be associated with the cable cartridge 104. In such embodiments, the first compartment 136 may be defined by a recess 142 defined within the top surface 110 of the first end 122 of the base housing 102, such as within the first housing piece 118 of the base housing 102. In some embodiments, the recess 142 may be defined by connection of the first housing piece 118 to the second housing piece 120 of the base housing 102. For instance, the first housing piece 118 may include an aperture 144 defined therethrough, in which case the second housing piece 120 may define the bottom of the recess 142 when the second housing piece 120 is connected to the first housing piece 118.

The recess 142 may be sized and shaped to receive at least a portion of the cable cartridge 104. For instance, a portion of the cable cartridge 104 may be received within the recess 142 when the cable cartridge 104 is connected to the base housing 102. In this manner, the first compartment 136 may be unsealed for at least partial receipt of the cable cartridge 104. As shown, the first compartment 136 may include a first lip 150 and a second lip 152 for interfacing with respective portions of the cable cartridge 104 to secure the cable cartridge 104 to the base housing 102, as explained in detail below.

The second compartment 138 may be associated with a second feature, component, or assembly of the cable handling system 100. For instance, the second compartment 138 may house one or more electronics 160 of the cable handling system 100. As shown in FIG. 4, the one or more electronics 160 housed within the second compartment 138 may include a printed circuit board (PCB) 162 secured to the base housing 102 and a cable 164 connected to the PCB 162. The cable 164 may include a first connector 170 connecting the cable 164 to the PCB 162 and a second connector 172 connecting the cable 164 with the cable cartridge 104. As described more fully below, the one or more electronics 160 may be process a control signal received from the control cable 108 of the cable cartridge 104. For instance, the second connector 172 may connect the cable 164 with the control cable 108 housed within the cable cartridge 104. Depending on the application, the first connector 170 and the second connector 172 may be optical fiber connectors. For example, the first connector 170 may be an SC connector and the second connector 172 may be an ST connector, although other configurations are contemplated. The PCB 162 may include one or more processors, chipsets, or logic structures configured to convert the signal(s) received from the cable cartridge 104 into one or more signals for controlling an associated robot. For instance, the PCB 162 may convert optic signals (e.g., fiber optic signals) received from the cable cartridge 104 into one or more electrical signals understandable by an associated robot, or vice versa.

With continued reference to FIG. 4, the second compartment 138 may be sealed to limit ingress of dirt, fluid, and other debris into the second compartment 138. For instance, the first and second housing pieces 118, 120 of the base housing 102 may be secured together to define the second compartment 138 as an enclosed space. To maintain a seal between the first and second housing pieces 118, 120 of the base housing 102, a first gasket 178 may be positioned between the first housing piece 118 and the second housing piece 120 of the base housing 102. The second connector 172 may extend from within the second compartment 138 into the first compartment 136. For example, the second connector 172 may be sealed to a first interior wall 182 of the first housing piece 118 separating the first compartment 136 from the second compartment 138. In such embodiments, one side of the second connector 172 may be positioned within the first compartment 136 for connection with the cable cartridge 104, and another side of the second connector 172 may be positioned within the sealed second compartment 138.

As shown in FIGS. 3-4, a sealed cable gland 184 extends through the first housing piece 118 of the second compartment 138 to provide an electrical connection from the PCB 162 to an associated robot. For instance, an electrical cable (not shown) may extend from the PCB 162 and through the sealed cable gland 184 for connection with an associated robot. In some embodiments, the second compartment 138 may include a first vacuum port 188. The first vacuum port 188 may extend through the first housing piece 118 and may be used to ensure proper sealing of the second compartment 138. For instance, a vacuum may be pulled through the first vacuum port 188 during or after manufacture of the cable handling system 100 to ensure the second compartment 138 is sealed adequately. The second compartment 138 may include an IP67 waterproof rating.

The third compartment 140 may be associated with a third feature, component, or assembly of the cable handling system 100. For example, the third compartment 140 may house at least a portion of the outfeed assembly 106. As described more fully below, the outfeed assembly 106 may be configured to deploy the control cable 108 from the cable cartridge 104. In such embodiments, the outfeed assembly 106 may include one or more transmission components (e.g., gears, gear trains, etc.) housed within the third compartment 140. Like the second compartment 138, the third compartment 140 may be sealed to limit ingress of dirt, fluid, and other debris into the third compartment 140. To maintain the seal between the first and second housing pieces 118, 120 of the base housing 102, a second gasket 192 may be positioned between the first housing piece 118 and the second housing piece 120 of the base housing 102.

In some embodiments, the first gasket 178 sealing the second compartment 138 and the second gasket 192 sealing the third compartment 140 may be integrated into a single gasket element. For instance, the first gasket 178 and the second gasket 192 may form a single gasket 194 with a "Figure 8" shape (see FIG. 4).

In some embodiments, the second compartment 138 may be separate from the third compartment 140. For instance, as shown in FIG. 4, the first housing piece 118 may include a second interior wall 198 separating the second compartment 138 from the third compartment 140. This may ensure that the one or more electronics 160 housed within the second compartment 138 remain dry even if the third compartment 140 leaks. Like the second compartment 138, the third compartment 140 may include a second vacuum port 202. The second vacuum port 202 may extend through the first housing piece 118 and may be used to ensure proper sealing of the third compartment 140, such as pulling a vacuum through the second vacuum port 202 during or after manufacture of the cable handling system 100 to ensure the third compartment 140 is sealed adequately. The third compartment 140 may include an IP67 waterproof rating.

FIG. 5 illustrates a perspective view of a cable cartridge 104 of the cable handling system 100 in accordance with an embodiment of the disclosure. Referring to FIG. 5, the cable cartridge 104 may include many configurations. For example, the cable cartridge 104 may include a one or multi-piece housing 500 containing the control cable 108. The housing 500 is defined by a bottom wall 510 and an enclosure 512 extending from the bottom wall 510. Similar to the base housing 102, the cable cartridge 104 may include an oval or elliptical shape, although other configurations are contemplated. The cable cartridge 104 may include a plurality of exit points allowing opposing ends of the control cable 108 to exit the housing 500. For instance, the cable cartridge 104 may include a first exit 520 and a second exit 522. The first exit 520 may be defined through the bottom wall 510 and may allow a first cable end 530 of the control cable 108 to exit the housing 500. The second exit 522 may be defined through the enclosure 512 and may allow a second cable end 532 of the control cable 108 to exit the housing 500. In some embodiments, the cable cartridge 104 may include respective hoods configured to shield or otherwise protect the first exit 520 and the second exit 522, or at least the portions of the control cable 108 at the first exit 520 and the second exit 522. For example, the cable cartridge 104 may include a first hood 540 positioned over the first exit 520 and a second hood 542 positioned over the second exit 522.

The first cable end 530 of the control cable 108 may be connectable to the second connector 172 positioned within the recess 142 of the first compartment 136. For instance, the first cable end 530 of the control cable 108 may include a bayonet-type, ¼ turn to lock connector that interfaces with the second connector 172 to connect the control cable 108 to the one or more electronics 160 within the second compartment 138 of the base housing 102. The second cable end 532 of the control cable 108 may be connectable to a controller. For example, the second cable end 532 of the control cable 108 may include a similar bayonet-type, ¼ turn to lock connector that interfaces with the controller to connect the control cable 108 to the controller.

Once connected, a wired control signal may be sent from the controller to the robot via the cable handling system 100 to control one or more operations of the robot. For instance, a wired control signal may be sent, via the control cable 108, from the controller to the one or more electronics 160 housed within the second compartment 138 of the base housing 102, at which point the control signal may be converted by the PCB 162 into appropriate commands for the robot to perform a desired action, such as traversing across a surface in a desired direction. As the robot traverses across the surface, the control cable 108 may be deployed from the cable cartridge 104, such as from the second exit 522 of the cable cartridge 104, to maintain a wired connection between the robot and the controller. For instance, the control cable 108 may be wound within the cable cartridge 104 such that the cable stows compactly within the housing 500 and pays out of the cable cartridge 104 easily and without twisting or tangling. As described herein, the control cable 108 may be any type of cable facilitating wired communication between the controller and the robot. For instance, the control cable 108 may be a fiber optic cable or other cable permitting one or more communication and/or power signals to travel between the controller and the robot.

The cable cartridge 104 may be removably connected to the base housing 102. For instance, the cable cartridge 104 may include a snap latch 550 or other quick snap style mechanism to snap fit the cable cartridge 104 to the first compartment 136 of the base housing 102. As shown in FIG. 5, the snap latch 550 includes one or more tabs 552 and a snap 554 extending from the bottom wall 510, such as on or adjacent opposing sides of the bottom wall 510. The tabs 552 may extend in a direction generally away from the snap 554, such as from a ridge 560 or wall extending from the bottom wall 510 to space the tabs 552 from the bottom wall 510. The snap 554 may be formed as a lever 566 extending from the bottom wall 510 and a ledge 568 extending from the lever 566 towards the tabs 552. The lever 566 may resiliently bend towards and away from the tabs 552 to releasably attach the cable cartridge 104 to the base housing 102.

To secure the cable cartridge 104 to the base housing 102, the cable cartridge 104 may be angled, pivoted, or otherwise positioned such that the tabs 552 of the snap latch 550 engage the first lip 150 of the first compartment 136 (e.g., such that the first lip 150 is positioned at least partially between the tabs 552 and the bottom wall 510 of the cable cartridge 104). The cable cartridge 104 may then be pivoted or otherwise moved towards the base housing 102 to latch the snap 554 to the second lip 152 of the first compartment 136. For instance, as the cable cartridge 104 is pivoted towards the base housing 102, the ledge 568, which may be formed as a ramp, may engage the second lip 152, causing the lever 566 to bend away from tabs 552. Once the ledge 568 clears the second lip 152, the lever 566 may snap towards the tabs 552, securing the second lip 152 at least partially between the ledge 568 and the bottom wall 510 of the cable cartridge 104. To remove the cable cartridge 104 from the base housing 102, the lever 566 may be bent away from the tabs 552 to create sufficient clearance between the ledge 568 and the second lip 152, after which the cable cartridge 104 may be pivoted away and removed from the base housing 102.

In some embodiments, the cable cartridge 104 may be designed for one-time use. For instance, the cable cartridge 104 may be designed such that the control cable 108 is only deployable from the housing and cannot be retracted back into the housing. Thus, the cable cartridge 104 may be a disposable item per use of an associated robot. For instance, each mission or deployment of an associated robot may require a new cable cartridge 104.

The cable cartridge 104 may include other features for convenience. For example, the cable cartridge 104 may include one or more pads 570 that eliminate or reduce manufacturing tolerances when the cable cartridge 104 is installed to the base housing 102. For instance, the pads 570, which may be formed of rubber or other compressible material, may be sized and shaped to take up any slop between the cable cartridge 104 and the base housing 102 to maintain a secure connection of the cable cartridge 104 to the base housing 102. In some embodiments, the bottom wall 510 may include one or more molded-in-features 580 that secure the first cable end 530 and second cable end 532 during storage and/or transport. For instance, the molded-in-features 580 may releasably secure the first cable end 530 and the second cable end 532 to the bottom wall 510. Once the cable cartridge 104 is to be secured to the base housing 102, the first cable end 530 and the second cable end 532 may be released from the molded-in-features 580 for connection with the base housing 102 and the controller, respectively. In some embodiments, the cable cartridge 104 may include a cable clamp 582 secured to the housing to guide the electrical cable extending from the base housing 102 to the robot. FIG. 5 also shows caps 584 secured to the first cable end 530 and the second cable end 532 of the control cable 108.

Accordingly, FIG. 5 illustrates the cable cartridge 104 in a shipping or storage configuration. When the cable cartridge 104 is connected to the base housing 102, the caps 584 are removed and the cable ends 530, 532 secured to their respective connections.

Figures 6, 7:
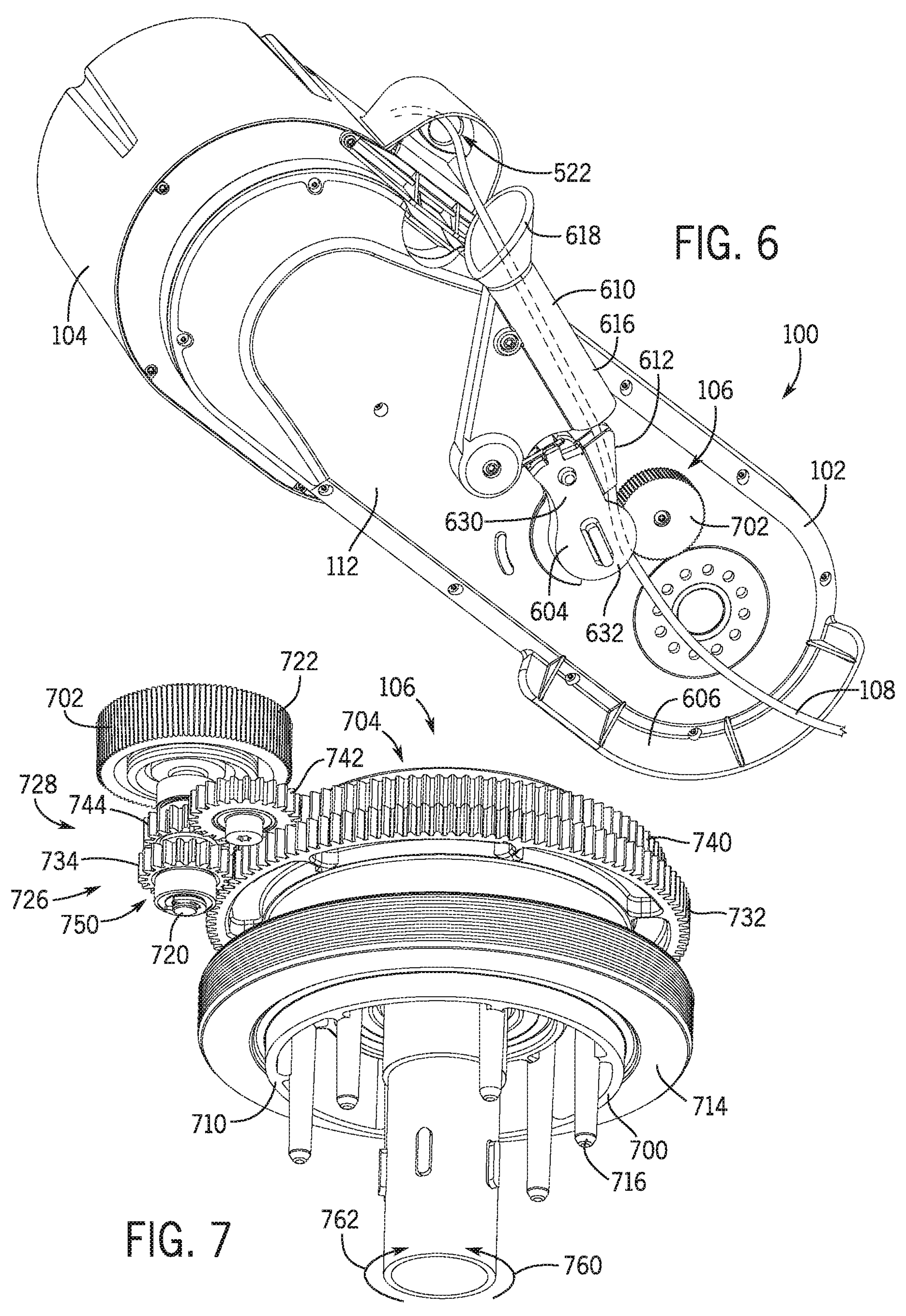
FIG. 6 illustrates a bottom perspective view of the cable handling system of FIG. 1 and showing a routing arrangement of a control cable from the cable cartridge in accordance with an embodiment of the disclosure.
FIG. 7 illustrates an outfeed assembly of the cable handling system of FIG. 1 in accordance with an embodiment of the disclosure.

FIG. 6 illustrates a bottom perspective view of the cable handling system 100 and showing a routing arrangement of the control cable 108 from the cable cartridge 104 in accordance with an embodiment of the disclosure. The control cable 108 may be routed from the cable cartridge 104 in many configurations to control deployment of the control cable 108. Referring to FIG. 6, the base housing 102 may include one or more cable guides, such as a plurality of cable guides, directing the control cable 108 to the outfeed assembly 106, a retainer 604 coupling the control cable 108 to the outfeed assembly 106, and a deflector 606 directing the control cable 108 away from the cable handling system 100. For instance, the base housing 102 may include a first cable guide 610 and a second cable guide 612. The first cable guide 610 may be fixed to the base housing 102, such as to the bottom surface 112 of the base housing 102. As shown, the first cable guide 610 may include a guide tube 616 with a funnel-type end 618. The first cable guide 610 may be positioned such that the funnel-type end 618 is positioned adjacent to (e.g. below) the second exit 522 of the cable cartridge 104. In such embodiments, the funnel-type end 618 of the first cable guide 610 may ease the control cable 108 into the guide tube 616, such as providing a smooth transition of the control cable 108 from the second exit 522 and into the guide tube 616. The second cable guide 612 may include a guide channel, which may be formed on the retainer 604.

The retainer 604 may include many configurations operable to couple the control cable 108 to the outfeed assembly 106. For example, the retainer 604 may include a spring-loaded arm 630 with a freewheeling roller 632 that presses the control cable 108 against the outfeed assembly 106. In such embodiments, the arm 630 may be rotated to move the roller 632 towards or away from the outfeed assembly 106 to vary the distance between the roller 632 and the outfeed assembly 106. For instance, the arm 630 may be rotated to move the roller 632 away from the outfeed assembly 106 to account for larger diameter control cables. Similarly, the arm 630 may be rotated to move the roller 632 towards the outfeed assembly 106 to account for smaller diameter control cables. In such embodiments, the arm 630 (e.g., the roller 632) may be biased towards the outfeed assembly 106 to maintain proper engagement of the control cable 108 against the outfeed assembly 106. As noted above, the second cable guide 612 may be formed on the arm 630 to properly position the control cable 108 on the roller 632 and against the outfeed assembly 106. For instance, after exiting the guide tube 616 of the first cable guide 610, the control cable 108 may be routed through the guide channel of the second cable guide 612 and between the roller 632 and the outfeed assembly 106.

The deflector 606 may include many configurations operable to direct the control cable 108 away from the cable handling system 100. For instance, the deflector 606 may be a rib-like structure extending from the bottom surface 112 and/or rim 114 of the base housing 102. As shown, the deflector 606 extends from the base housing 102 at an angle, such as at a 45° angle from the bottom surface 112 of the base housing 102, less than 45° angle from the bottom surface 112 of the base housing 102, or greater than a 45° angle from the bottom surface 112 of the base housing 102. Depending on the application, the deflector 606 may run along a portion of the rim 114 of the base housing 102. For example, the deflector 606 may run along the rim 114 around the second end 124 and a portion of the second side 128 of the base housing 102. As described herein, the deflector 606 may be sized and shaped to direct the control cable 108 away from an associated robot, such as directing the control cable 108 to the side of the robot or to another location limiting entanglement of the control cable 108 with the robot.

FIG. 7 illustrates the outfeed assembly 106 of the cable handling system 100 in accordance with an embodiment of the disclosure. Referring to FIGS. 1, 3, 4, and 7, the outfeed assembly 106 may be configured to couple to a drive mechanism of a robot such that movement of the drive mechanism deploys the control cable 108 from the cable cartridge 104. In some embodiments, the outfeed assembly 106 includes a drive hub 700 for coupling to the drive mechanism of the robot, an outfeed wheel 702 for deploying a length of the control cable 108, and a gear train 704 linking the drive hub 700 to the outfeed wheel 702 such that rotation of the drive hub 700 rotates the outfeed wheel 702 to deploy the control cable 108. Each component or assembly of the outfeed assembly 106 will be described in more detail below.

The drive hub 700 may be rotationally coupled to the base housing 102 to rotate with the drive mechanism of the robot. For example, the drive hub 700 may include a circular body 710 that is rotationally coupled to the base housing 102 within an aperture 712 defined through the top surface 110 of the base housing 102 and into the third compartment 140. In some embodiments, the body 710 may be rotationally coupled to the base housing 102 via a bearing 714 or other element allowing rotational movement of the body 710 relative to the base housing 102. To maintain a sealed characteristic of the third compartment 140, the body 710 may be sealed to the base housing 102 (or to the bearing 714) via a lip seal or other rotational seal.

As shown, the drive hub 700 may include one or more bosses 716 extending from the body 710 for engagement with the drive mechanism of the robot. For instance, the bosses 716 may engage one or more slots or other corresponding features defined in the robot's drive mechanism such that rotation of the drive mechanism causes rotation of the drive hub 700 through engagement of the bosses 716 with the drive mechanism. Depending on the application, the bosses 716 may be formed integrally with the body 710 of the drive hub 700 or may be separate elements secured to the body 710.

The outfeed wheel 702 may be rotationally coupled to the base housing 102 to drive deployment of the control cable 108 from the cable cartridge 104. For instance, the outfeed wheel 702 may be rotationally coupled to the bottom surface 112 of the base housing 102 adjacent to the roller 632 of the arm 630 (see FIG. 6). For example, the outfeed wheel 702 may include a drive shaft 720 rotationally coupled to the base housing 102, such as in a manner similar to the drive hub 700 to the base housing 102. In some embodiments, the outfeed wheel 702 may include a knurled surface 722 (e.g., a diamond or straight-line pattern) to frictionally engage the control cable 108 positioned between the outfeed wheel 702 and the roller 632 of the arm 630. In such embodiments, the arm 630 may be biased to press the roller 632 against the outfeed wheel 702 to maintain friction of the control cable 108 against the knurled surface 722. As described below, the outfeed wheel 702 may be coupled to the drive hub 700 such that rotation of the drive hub 700 causes rotation of the outfeed wheel 702 (e.g., corresponding rotation, a geared reduction rotation, and geared overdrive rotation, etc.).

The gear train 704 may include many configurations mechanically linking the drive hub 700 to the outfeed wheel 702 such that rotation of the drive hub 700 rotates the outfeed wheel 702. As best illustrated in FIG. 7, the gear train 704 may include a plurality of parallel gear trains to drive rotation of the outfeed wheel 702 and control outfeeding of the control cable 108. For instance, the gear train 704 may include a first gear train 726 and a second gear train 728. The first gear train 726 may include a first drive gear 732 connected to the drive hub 700 and a first driven gear 734 connected to the drive shaft 720 of the outfeed wheel 702, the first driven gear 734 in meshing engagement with the first drive gear 732. The first drive gear 732 may be formed integrally with the body 710 of the drive hub 700. The first gear train 726 may be associated with a first direction of the robot. For example, the first gear train 726 may be associated with the robot driving forward. The first gear train 726 may include a first gear ratio between the first drive gear 732 and the outfeed wheel 702. The first gear ratio may be set to outfeed the control cable 108 between 10% and 20% faster than a ground speed of the robot, such as between 14% and 18% faster or approximately 16% faster than the robot's ground speed.

The second gear train 728 may include a second drive gear 740 connected to the drive hub 700, an idler gear 742 in meshing engagement with the second drive gear 740, and a second driven gear 744 connected to the drive shaft 720 of the outfeed wheel 702 and in meshing engagement with the idler gear 742. In some embodiments, the second drive gear 740 may be formed integrally with the body 710 of the drive hub 700. As shown in FIG. 4, the idler gear 742 may be rotationally mounted to the firs housing piece of the base housing 102. The second gear train 728 may be associated with a second direction of the robot. For instance, the second gear train 728 may be associated with the robot driving in reverse. The second gear train 728 may include a second gear ratio between the second drive gear 740 and the outfeed wheel 702. The second gear ratio may be set to outfeed the control cable 108 between 10% and 20% faster than a ground speed of the robot, such as between 14% and 18% faster or approximately 16% faster than the robot's ground speed. In some embodiments, the second gear ratio may be equal to the first gear ratio. In this manner, the gear train 704 may include a single gear ratio regardless of the direction the robot is driven. For instance, the gear train 704 may include the same gear ratio for each direction of movement.

Each of the first driven gear 734 and the second driven gear 744 may be connected to the drive shaft 720 of the outfeed wheel 702 with a one-way locking bearing 750. For instance, each of the first driven gear 734 and the second driven gear 744 may be connected to the drive shaft 720 using a sprag or Sprague type bearing or clutch, although other configurations are contemplated, including trapped roller or similar mechanisms. In such embodiments, the one-way locking bearings 750 may allow free rotation of the drive shaft 720 relative to a driven gear in one rotational direction but lock the driven gear to the drive shaft 720 in another rotational direction. For example, when the robot is driven forward, the first gear train 726 may be active to control rotation of the outfeed wheel 702 to deploy the control cable 108, with the second gear train 728 inactive or otherwise "freewheeling" against the drive shaft 720. When the robot is driven in reverse, the second gear train 728 may be active to control rotation of the outfeed wheel 702 to deploy the control cable 108, with the first gear train 726 inactive or otherwise "freewheeling" against the drive shaft 720, as detailed below.

Referring to FIG. 7, when the robot is driven forward, the drive hub 700 may be rotated by the drive mechanism of the robot in a first rotational direction 760. Rotation of the drive hub 700 in the first rotational direction 760 may also drive the first drive gear 732 in the first rotational direction 760. Through meshing engagement of the first drive gear 732 with the first driven gear 734, rotation of the first drive gear 732 in the first rotational direction 760 may drive the first driven gear 734 in an opposite second rotational direction 762. As the first driven gear 734 is rotated in the second rotational direction 762, the one-way locking bearing 750 connecting the first driven gear 734 to the drive shaft 720 may lock or otherwise limit relative rotational movement between the first driven gear 734 and the drive shaft 720, thereby causing the drive shaft 720 to also rotate in the second rotational direction 762. Rotation of the drive shaft 720 in the second rotational direction 762 may rotate the outfeed wheel 702 in the second rotational direction 762 to outfeed the control cable 108 from the cable cartridge 104.

When the robot is driven forward, the second gear train 728 may be inactive or otherwise be in a "freewheeling" condition. For instance, when the robot is driven forward, rotation of the drive hub 700 in the first rotational may drive the second drive gear 740 in the first rotational direction 760, which may drive the idler gear 742 in the second rotational direction 762 through meshing engagement of the idler gear 742 with the second drive gear 740. As the idler gear 742 rotates in the second rotational direction 762, the second driven gear 744 may be driven to rotate in the first directional direction. In such embodiments, the one-way locking bearing 750 connecting the second driven gear 744 to the drive shaft 720 may be configured to freewheel as the second driven gear 744 is rotated in the first rotational direction 760 to allow relative rotational movement between the second driven gear 744 and the drive shaft 720. Thus, when the robot is driven forward, the first gear train 726 may be active to rotate the outfeed wheel 702, whereas the second gear train 728 may be inactive in outfeeding the control cable 108.

In like manner, when the robot is driven in reverse, the drive hub 700 may be rotated by the drive mechanism of the robot in the second rotational direction 762. Rotation of the drive hub 700 in the second rotational direction 762 may drive the second drive gear 740 in the second rotational direction 762. Rotation of the second drive gear 740 in the second rotational direction 762 may drive the idler gear 742 in the first rotational direction 760, which in turn drives the second driven gear 744 in the second rotational direction 762 through meshing engagement of the idler gear 742 between the second drive gear 740 and the second driven gear 744. As the second driven gear 744 is rotated in the second rotational direction 762, the one-way locking bearing 750 connecting the second driven gear 744 to the drive shaft 720 may lock or otherwise limit relative rotational movement between the second driven gear 744 and the drive shaft 720, thereby causing the drive shaft 720 to also rotate in the second rotational direction 762. Rotation of the drive shaft 720 in the second rotational direction 762 may rotate the outfeed wheel 702 in the second rotational direction 762 to outfeed the control cable 108 from the cable cartridge 104.

When the robot is driven in reverse, the first gear train 726 may be inactive or otherwise be in a "freewheeling" condition. For instance, when the robot is driven in reverse, rotation of the drive hub 700 in the second rotational may drive the first drive gear 732 in the second rotational direction 762, which may drive the first driven gear 734 in the first rotational direction 760 through meshing engagement of the first driven gear 734 with the first drive gear 732. In such embodiments, the one-way locking bearing 750 connecting the first driven gear 734 to the drive shaft 720 may be configured to freewheel as the first driven gear 734 is rotated in the first rotational direction 760 to allow relative rotational movement between the first driven gear 734 and the drive shaft 720. Thus, when the robot is driven in reverse, the second gear train 728 may be active to rotate the outfeed wheel 702, whereas the first gear train 726 may be inactive in outfeeding the control cable 108.

In this manner, the outfeed assembly 106 may be configured to deploy the control cable 108 from the cable cartridge 104 regardless of the direction of movement of the drive mechanism (i.e., regardless of the direction the robot is driven). For instance, through use of the one-way locking bearings 750 between the drive shaft 720 and the first and second driven gears 734, 744, the outfeed wheel 702 may rotate in only one direction (i.e., the second rotational direction 762) to deploy the control cable 108 from the cable cartridge 104 regardless of which direction the drive hub 700 is rotated by the drive mechanism of the robot. Such configurations may ensure a reliable wired connection for robust operation. For example, outfeeding the control cable 108 regardless of the direction the robot is driven may limit dragging, snagging, or tangling, among others, of the control cable 108 as the robot traverses across a surface. In addition, outfeeding the control cable 108 at a rate faster than a ground speed of the robot may further ensure the control cable 108 is never dragged, snagged, or otherwise damaged during operation of the robot.

Figures 8, 9:
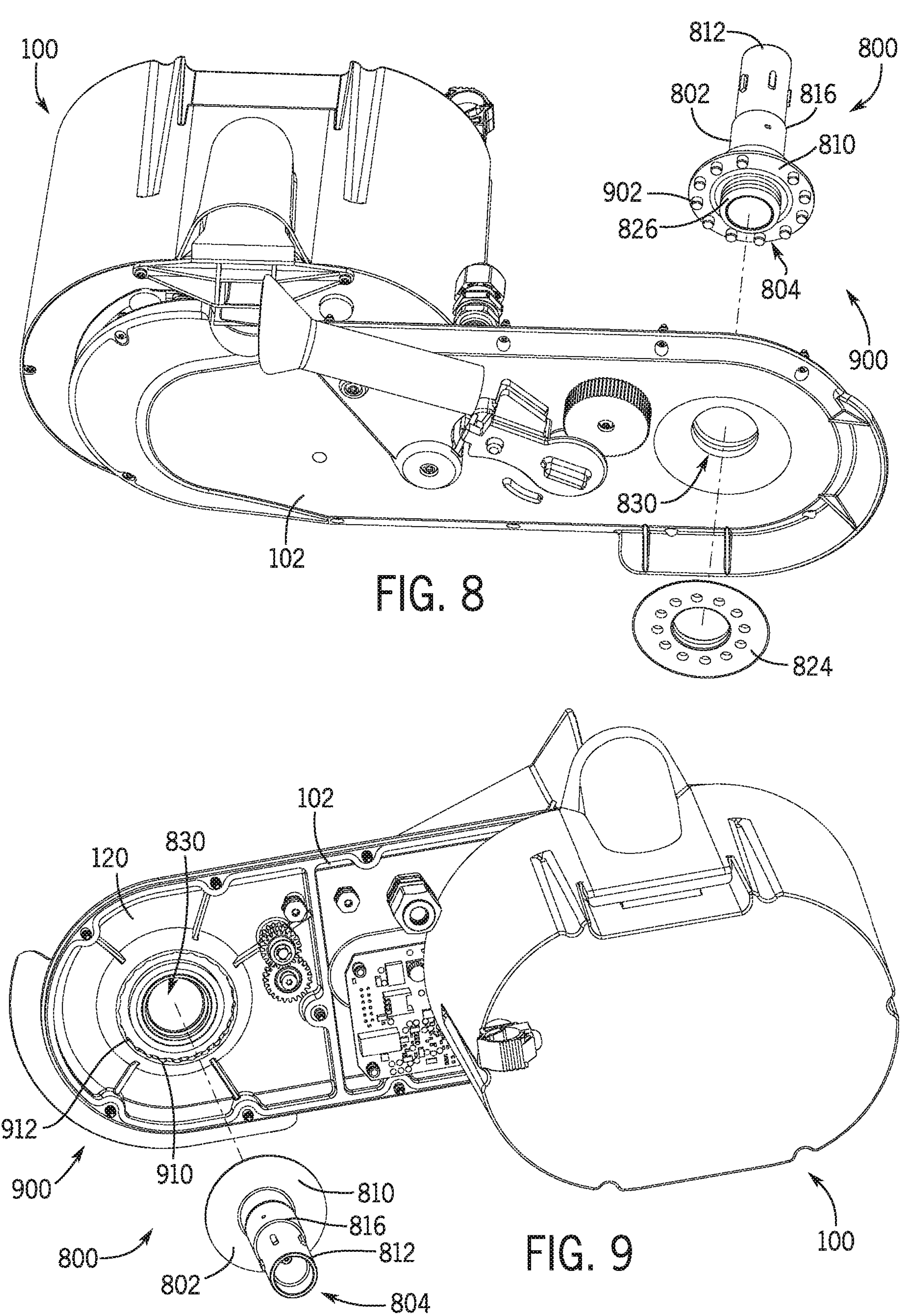
FIG. 8 illustrates a bottom perspective view of the cable handling system of FIG. 1 with an attachment assembly separated from the cable handling system for illustration purposes in accordance with an embodiment of the disclosure.
FIG. 9 illustrates a top perspective view of the cable handling system of FIG. 1 with the attachment assembly separated from the cable handling system and a portion of the base housing removed for illustration purposes in accordance with an embodiment of the disclosure.

FIG. 8 illustrates a bottom perspective view of the cable handling system 100 with an attachment assembly 800 separated from the cable handling system 100 for illustration purposes in accordance with an embodiment of the disclosure. FIG. 9 illustrates a top perspective view of the cable handling system 100 with the attachment assembly 800 separated from the cable handling system 100 and a portion of the base housing 102 removed for illustration purposes in accordance with an embodiment of the disclosure. Referring to FIGS. 8-9, the cable handling system 100 may include an attachment assembly 800 for connecting the cable handling system 100 to a robot. In some embodiments, the attachment assembly 800 may be coupled to or integrated with the drive hub 700 such that attachment of the cable handling system 100 to the robot via the attachment assembly 800 also couples the drive hub 700 to the drive mechanism of the robot, as explained further below.

The attachment assembly 800 may include many configurations to releasably attach the cable handling system 100 to a robot. For example, the attachment assembly 800 may include a hub 802 and a release assembly 804 coupled to the hub 802 to releasably secure the hub 802 to a robot, as explained below. The hub 802 may include a flange 810 and a tube 812 extending from the flange 810. The tube 812 may include a plurality of slots 814 defined therethrough and a shoulder 816 defined at a position along its length between the slots 814 and the flange 810. The hub 802 (e.g., the tube 812) may be rotationally coupled to the drive hub 700 of the outfeed assembly 106, such as via one or more bearings 820 and/or seals 830 (see FIG. 14).

As shown in FIGS. 8-9, the release assembly 804 may be positioned at least partially within the tube 812. The release assembly 804 may be movable between release and locking configurations. For example, actuation of the release assembly 804 may move the release assembly 804 from the locking configuration to the release configuration. Disengagement of the release assembly 804 may move (e.g., automatically) the release assembly 804 from the release configuration to the locking configuration. As described herein, the release configuration may be any configuration allowing the attachment assembly 800 to be attached to, released from, or otherwise moved relative to a robot. The locking configuration may be any configuration limiting removal of the attachment assembly 800 from the robot, attachment of the attachment assembly 800 to the robot, or relative movement between the attachment assembly 800 and the robot.

The attachment assembly 800 may be coupled to the cable handling system 100 in many configurations. For example, the hub 802 may be releasably attached to the base housing 102 via a nut 824. In such embodiments, the hub 802 may be positioned on one side of the base housing 102 and the nut 824 may be positioned on an opposite side of the base housing 102. For instance, the hub 802 may include a threaded portion 826 extending from the flange 810 in a direction opposite of the tube 812. In such embodiments, the threaded portion 826 may extend through an aperture 830 defined through the second housing piece 120, with the flange 810 positioned on one side of the second housing piece 120 and the nut 824 positioned on the opposite side of the second housing piece 120 (e.g., engaging the bottom surface 112 of the base housing 102). The nut 824 may then be threaded onto the threaded portion 826 of the hub 802 to sandwich the second housing piece 120 between the flange 810 and the nut 824. In some embodiments, the connection of the nut 824 to the base housing 102 may be designed to limit interference of the nut 824 with deployment of the control cable 108. For example, the nut 824 and/or base housing 102 may be shaped such that the nut 824 sits flush or substantially flush with the bottom surface 112 of the base housing 102 when the attachment assembly 800 is connected to the base housing 102.

Figure 10:
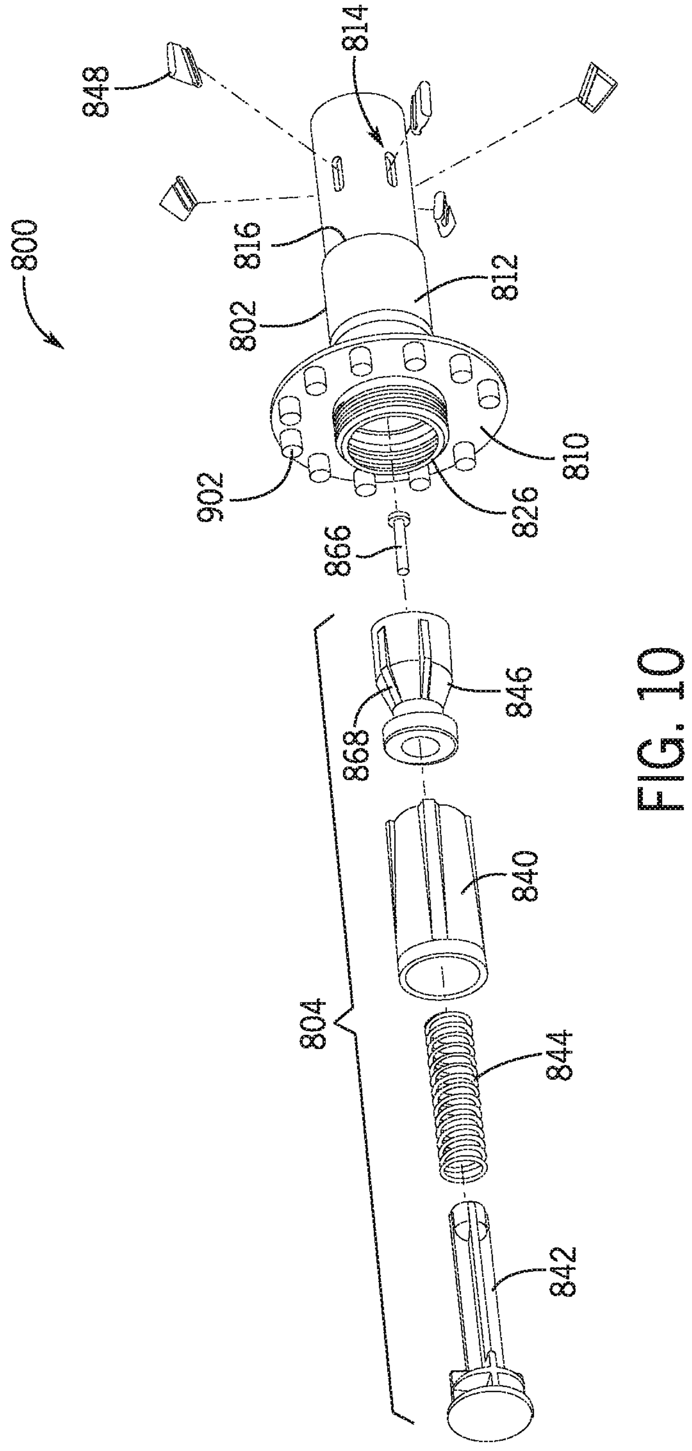
FIG. 10 illustrates an exploded view of the attachment assembly in accordance with an embodiment of the disclosure.
Figure 11:
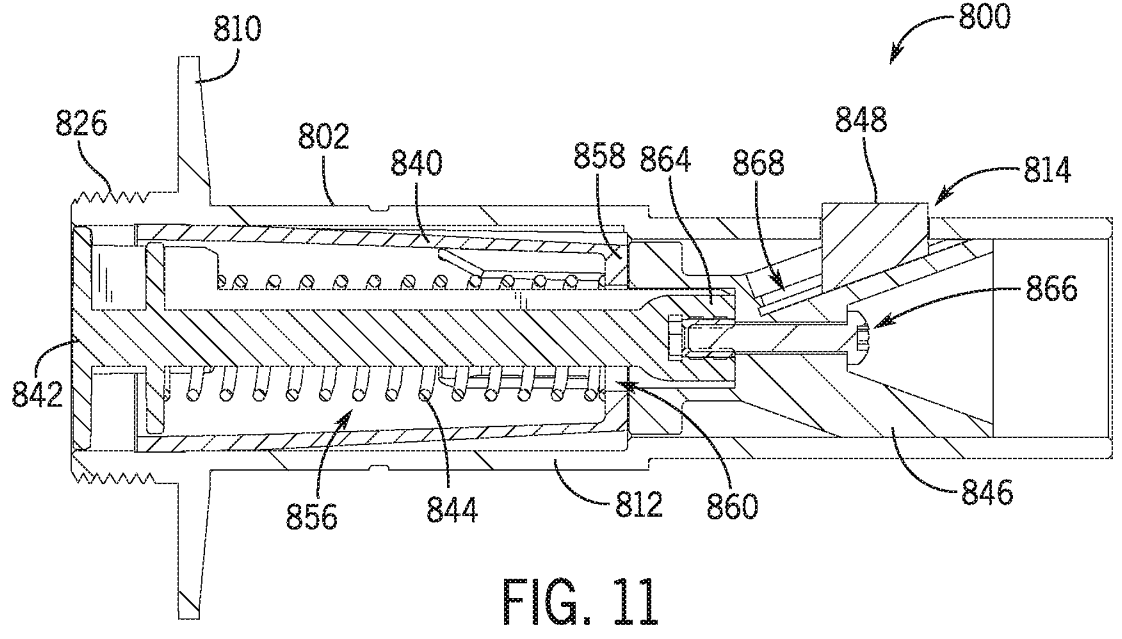
FIG. 11 illustrates a cross-sectional view of the attachment assembly in accordance with an embodiment of the disclosure.

FIG. 10 illustrates an exploded view of the attachment assembly 800 in accordance with an embodiment of the disclosure. FIG. 11 illustrates a cross-sectional view of the attachment assembly 800 in accordance with an embodiment of the disclosure. Referring to FIGS. 10-11, the release assembly 804 may include a housing 840, a button 842 slidably positioned at least partially within the housing 840, a spring 844 biasing movement of the button 842 within the housing 840, a plunger 846 secured to the button 842 outside of the housing 840, and a plurality of pawls 848 connected to the plunger 846. As best illustrated in FIG. 11, the housing 840 may include a cavity defined at least partially by a bottom wall and an aperture defined through the bottom wall. The button 842 may be slidably positioned at least partially within the cavity of the housing 840, with an attachment portion extending through the aperture of the housing 840. The spring 844 may be assembled onto the button 842 and may bias the button 842 away from the bottom wall of the housing 840. The plunger 846 may be secured to the attachment portion of the button 842 (e.g., via a screw 866) to retain the button 842. The plunger 846 may include a tapered portion with a plurality of channels 868 (e.g., T-slot channels) extending radially outward along the tapered portion.

This subassembly of the housing 840, button 842, spring 844, and plunger 846 may be inserted within the tube 812 of the hub 802. For example, the subassembly may be pressed into the tube 812, with the housing 840 frictionally engaging an interior surface of the tube 812. The pawls 848 may be inserted through the slots 814 of the tube 812 and into the channels 868 of the plunger 846 as the subassembly is pressed into place. In such embodiments, the pawls 848 may be slidably connected to the tapered portion of the plunger 846 such that sliding movement of the plunger 846 within the tube 812 moves the retracts or extends the pawls 848 within or from the slots 814 of the tube 812 as the pawls 848 slide along the tapered portion or ramp of the plunger 846. For example, movement of the plunger 846 away from the bottom wall of the housing 840, such as when the button 842 is pressed, may retract the pawls 848 into the tube 812. Similarly, movement of the plunger 846 towards the bottom wall of the housing 840, such as when the button 842 is released and biased away from the bottom wall via the spring 844, may extend the pawls 848 out of the tube 812. When the pawls 848 are retracted into the tube 812, the attachment assembly 800 may be attached to an associated robot, removed from the robot, or otherwise moved relative to the robot. When the pawls 848 are extended out of the tube 812, the pawls 848 may interface with corresponding features of an associated robot to lock the attachment assembly 800 to the robot, as explained below.

In some embodiments, the pawls 848 may be spaced apart to lock the attachment assembly 800 in a limited number of positions. For instance, the pawls 848 may be spaced asymmetrically around the tube 812 such that the attachment assembly 800 can lock into one or two positions relative to an associated robot, as described more fully below. Such configurations may ensure proper alignment of the cable handling system 100 relative to an associated robot.

Referring to FIGS. 8-9, the cable handling system 100 may include a slip clutch mechanism 900 integrated between the base housing 102 and the attachment assembly 800 to allow selective rotation of the base housing 102 relative to the attachment assembly 800. For example, the slip clutch mechanism 900 may protect the cable handling system 100 from impacts, drops, or other damaging high torque situations (e.g., driving the cable handling system 100 into an object), allowing the cable handling system 100 to slip at a designed threshold or break-away torque that limits damage. The threshold or break-away torque may be set at a level which is sufficient to limit accidental slipping but also properly protect the cable handling system 100. Example threshold or break-away torque values include 250 inch-pounds, between 200 inch-pounds and 300 inch-pounds, and between 230 inch-pounds and 270 inch-pounds.

As described herein, the slip clutch mechanism 900 may include one or more elements that resiliently deform or flex to allow the attachment assembly 800 to rotate when an overload condition or slip event occurs. When the overload condition occurs, the one or more elements flex and deform such that the attachment assembly 800 can rotate relative to the base housing 102 without causing permanent damage to the cable handling system 100. The slip clutch mechanism 900 may also be resettable after the slip event occurs. For instance, the slip clutch mechanism 900 may allow the cable handling system 100 to be rotated back to its original, correct position, such as manually, after the slip event occurs.

The slip clutch mechanism 900 may include a plurality of pins 902 extending from the flange 810 of the hub 802 and an undulating surface 904 defined in the base housing 102. The pins 902 may be machined into the face of the flange 810 or may be separate elements secured to the flange 810. The undulating surface 904 may include a series of alternating depressions 910 and ridges 912 that mate with the pins 902. For example, each pin may be positioned at least partially within a depression 910 between adjacent ridges 912. In some embodiments, the alternating depressions 910 and ridges 912 may be defined by partial pocket features molded into the base housing 102.

During rotation of the base housing 102 relative to the attachment assembly 800, such as during a slip event or during manual resetting of the slip clutch mechanism 900, the pins 902 and/or undulating surface 904 may resiliently deform as the pins 902 slide along the series of alternating depressions 910 and ridges 912. For example, the pins 902 may deform annularly inward and/or the undulating surface 904 may deform annularly outward as rotation of the base housing 102 relative to the attachment assembly 800 causes the pins 902 to ride up the ridges 912. Depending on the application, the pins 902 may be spaced symmetrically or asymmetrically along the flange 810 and/or the undulating surface 904 may include a symmetrical or an asymmetrical pattern. For example, asymmetrical spacing of the pins 902 along the flange 810 may create an index feature with an asymmetrical undulating surface 904 to align the slip clutch mechanism 900.

Figure 12:
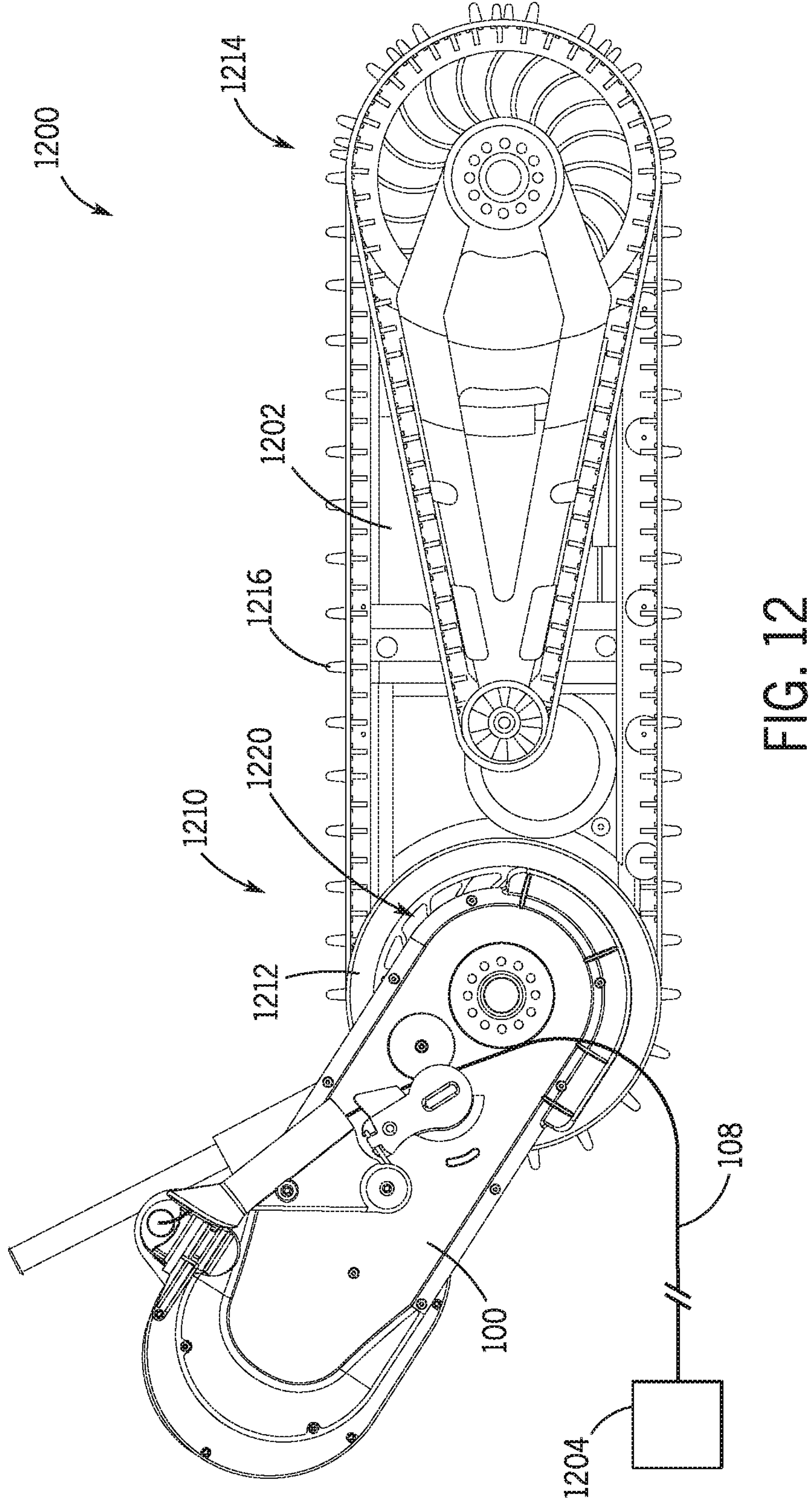
FIG. 12 illustrates a schematic perspective view of a system including the cable handling system of FIG. 1 connected to a robot and a controller in accordance with an embodiment of the disclosure.
Figure 13:
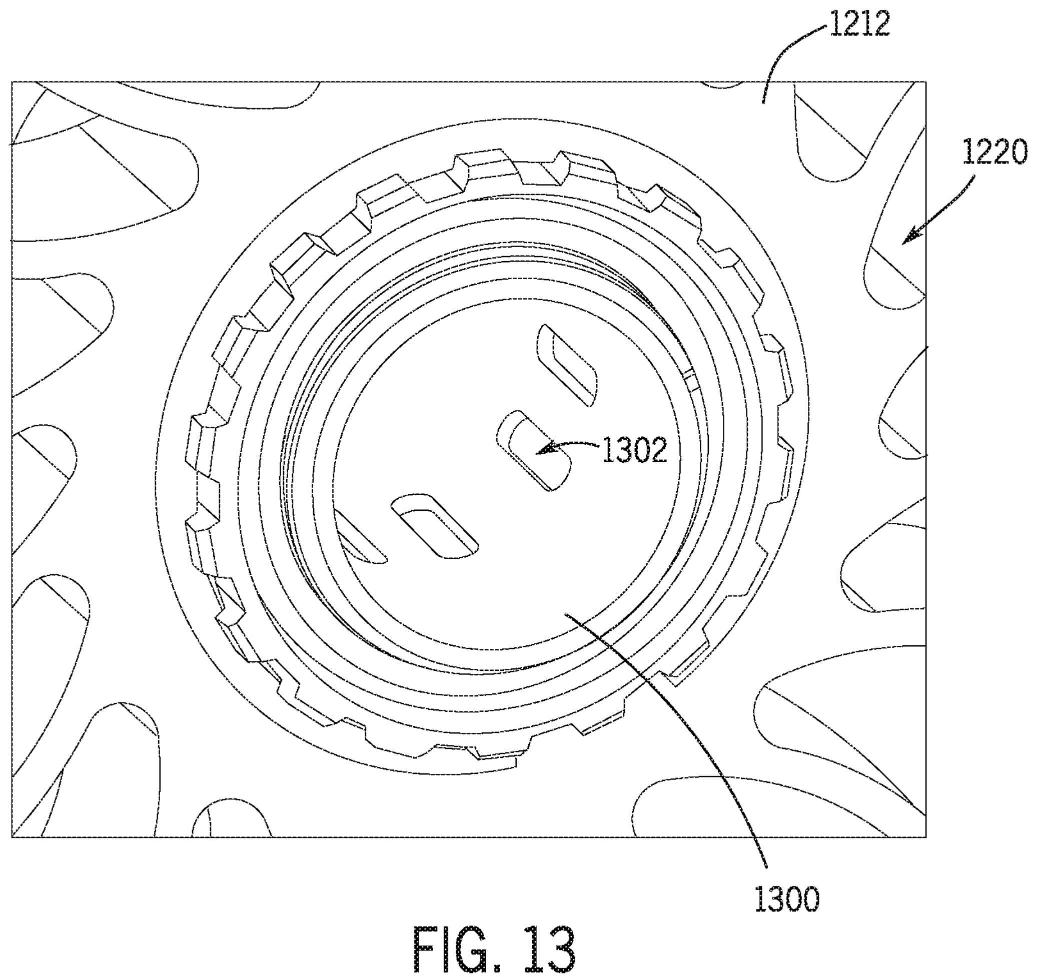
FIG. 13 illustrates an enlarged fragmentary view of an axle of the robot of FIG. 12 in accordance with an embodiment of the disclosure.
Figure 14:
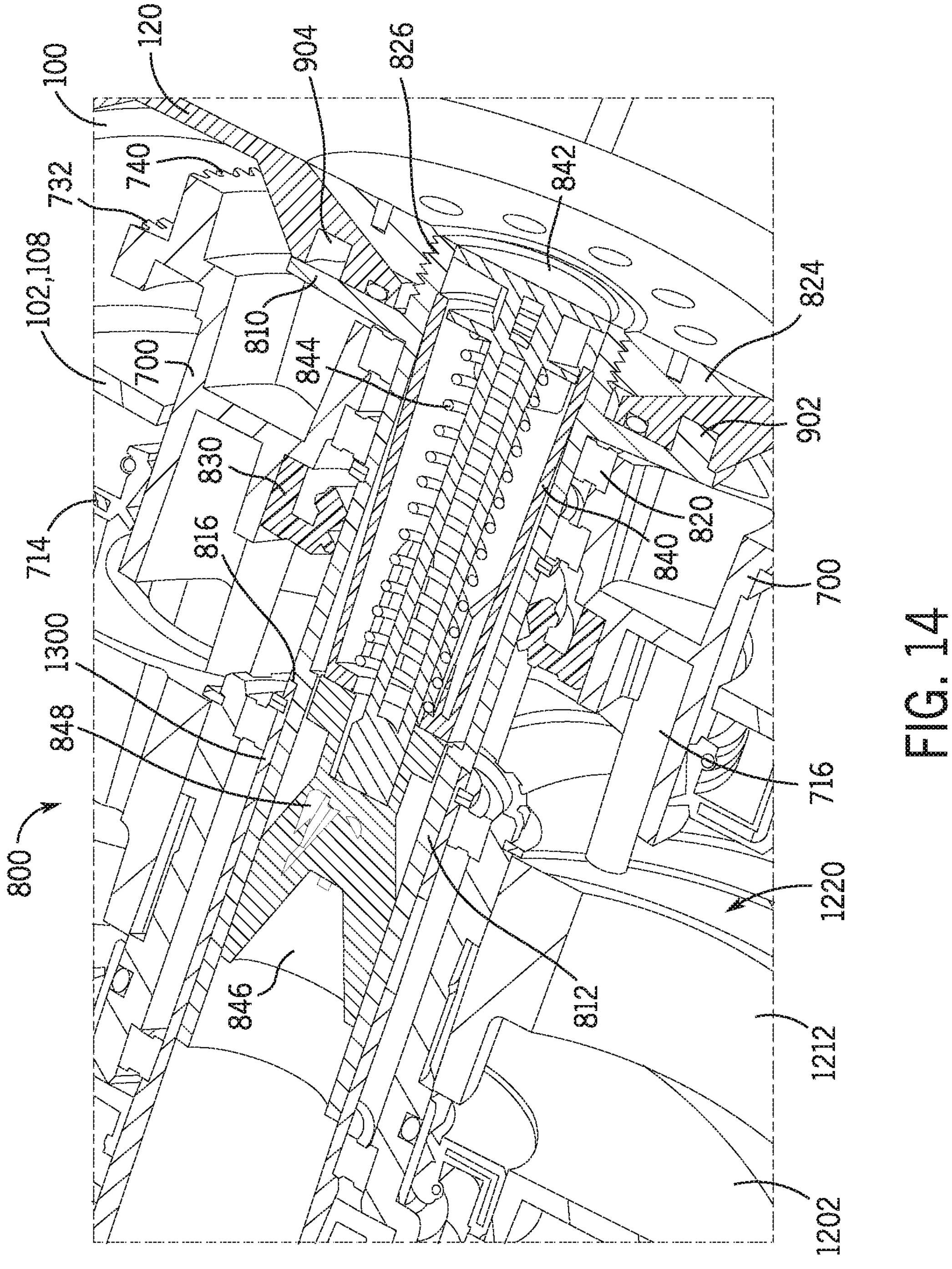
FIG. 14 illustrates a fragmentary cross-sectional view of the system of FIG. 12 and showing attachment of the cable handling system of FIG. 1 to the robot in accordance with an embodiment of the disclosure.

FIG. 12 illustrates a schematic perspective view of a system 1200 including the cable handling system 100 connected to a robot 1202 and a controller 1204 in accordance with an embodiment of the disclosure. FIG. 13 illustrates an enlarged fragmentary view of an axle of the robot 1202 in accordance with an embodiment of the disclosure. FIG. 14 illustrates a fragmentary cross-sectional view of the system 1200 and showing attachment of the cable handling system 100 to the robot 1202 in accordance with an embodiment of the disclosure. The robot 1202 shown in FIGS. 12-14 is for illustration purposes only and the robot 1202 may include other configurations. Similarly, the controller 1204 is illustrated in schematic only, and the controller 1204 may include many configurations. The robot 1202 and controller 1204 may be similar to the robot and controller described above.

As described herein, the robot 1202 is a mobile robot, such as a ground-based robot. As shown in FIG. 12, the robot 1202 is controllable by the controller 1204 and includes a drive mechanism 1210 operable to move the robot 1202 along a path. As noted above, the outfeed assembly 106 of the cable handling system 100 may be coupled to the drive mechanism 1210 of the robot 1202 to deploy the control cable 108 from the cable cartridge 104 as the drive mechanism 1210 moves the robot 1202 along a path. In such embodiments, the cable handling system 100 may provide a wired communication between the controller 1204 and the robot 1202.

For example, the cable handling system 100 may include a control cable 108 with opposing ends connected to the robot 1202 and the controller 1204 for wired communication therebetween, as explained above.

The robot 1202 may include many configurations. For example, the drive mechanism 1210 may include a wheel 1212. Depending on the application, the wheel 1212 may be a drive wheel or a driven wheel of the robot 1202. In some embodiments, the wheel 1212 may be associated with a track system 1214 of the robot 1202, such as driving, tensioning, or providing alignment of a track 1216 of the track system 1214. The outfeed assembly 106 may be coupled to the wheel 1212 of the robot 1202 such that movement of the wheel 1212 deploys the control cable 108 from the cable cartridge 104, as explained above. For example, the wheel 1212 may include one or more slots 1220 that receive the one or more bosses 716 extending from the body 710 of the drive hub 700 (see FIG. 14) such that rotation of the wheel 1212 causes rotation of the drive hub 700. In this manner, the outfeed assembly 106 may be driven directly by the wheel 1212 of the robot 1202.

Referring to FIG. 13, the drive mechanism 1210 of the robot 1202 may include an axle 1300 coupled to the wheel 1212. In such embodiments, the cable handling system 100 may be coupled to the axle 1300, such as via the attachment assembly 800 described above. For instance, the axle 1300 may include a diameter greater than the diameter of the tube 812 of the attachment assembly 800 and may include a plurality of mating slots 1302. Referring to FIG. 14, the tube 812 of the attachment assembly 800 may be positioned at least partially within the axle 1300, with the pawls 848 positioned at least partially within the mating slots 1302, to secure the cable handling system 100 to the axle 1300. For instance, the attachment assembly 800 may be positioned adjacent to the axle 1300 (e.g., the tube 812 aligned along the axis of the axle 1300) and the button 842 of the attachment assembly 800 may be pressed to retract the pawls 848 into the tube 812. Once the pawls 848 are retracted into the tube 812, the tube 812 of the attachment assembly 800 may be slid into the axle 1300 of the robot 1202 until the shoulder 816 of the tube 812 contacts the end of the axle 1300. When the tube 812 is positioned sufficiently within the axle 1300, such as when the shoulder 816 of the tube 812 contacts the end of the axle 1300, the button 842 may be released to extend the pawls 848 from the tube 812 and into the mating slots 1302 of the axle 1300 once aligned to secure the attachment assembly 800 to the axle 1300.

Figure 15:
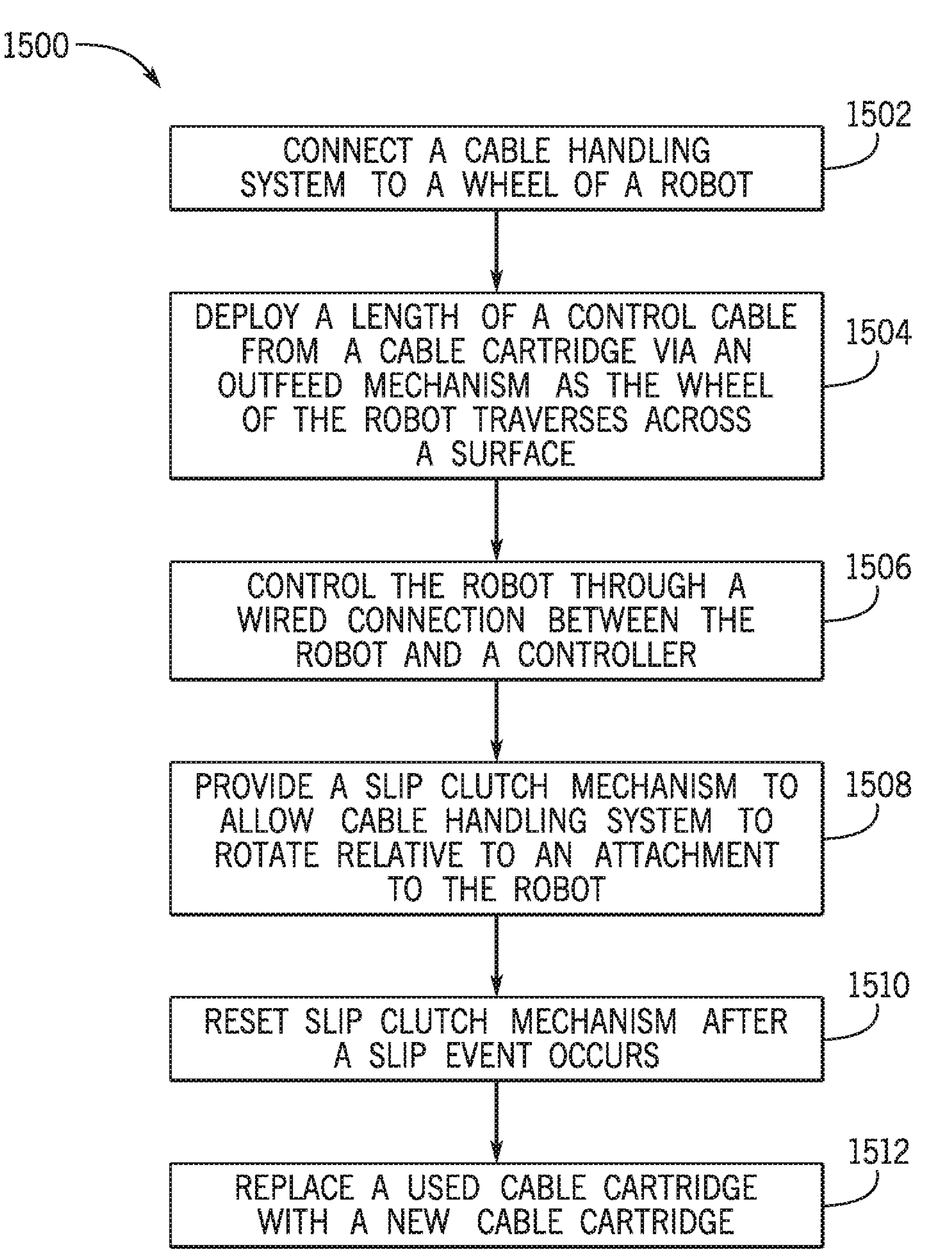
FIG. 15 illustrates a flowchart of a process for controlling deployment of a control cable from a cable handling system in accordance with an embodiment of the disclosure.

FIG. 15 illustrates a flowchart of a process 1500 for controlling deployment of a control cable from a cable handling system in accordance with an embodiment of the disclosure. Any step, sub-step, sub-process, or block of process 1500 may be performed in an order or arrangement different from the embodiments illustrated by FIG. 15. For example, in other embodiments, one or more blocks may be omitted from or added to the process 1500. Although process 1500 is described with reference to the embodiments of FIGS. 1-14, process 1500 may be applied to other embodiments.

In Block 1502, process 1500 includes connecting a cable handling system to a wheel of a robot. In some embodiments, the cable handling system may be releasably attached to an axle of the robot. The cable handling system may provide a wired communication between the robot and a controller. The cable handling system may include a cable cartridge, a control cable housed at least partially within the cable cartridge and connected between the controller and the robot, and an outfeed assembly for deploying the control cable from the cable cartridge. In some embodiments, the cable handling system may include an attachment assembly releasably attaching the cable handling system to the axle of the robot. The cable handling system, robot, controller, cable cartridge, control cable, outfeed assembly, and attachment assembly may be similar to the cable handling system 100, robot 1202, controller 1204, cable cartridge 104, control cable 108, outfeed assembly 106, and attachment assembly 800 of FIGS. 1-14, described above. For instance, the cable cartridge may be designed for one-time use.

In Block 1504, process 1500 includes deploying a length of the control cable from the cable cartridge via the outfeed assembly as the wheel of the robot traverses across a surface. For example, the robot wheel may drive a gear train, which in turn spins an outfeed wheel that deploys the control cable from the cable cartridge. In some embodiments, the control cable may be deployed from the cable cartridge regardless of the direction the wheel is rotated. For instance, the gear train may include one or more one-way clutch or bearing structures configured such that the outfeed wheel will only ever spin in the correct direction to outfeed the control cable.

The control cable may be routed such that the control cable exits the cable cartridge and routes through two cable guides leading to the outfeed wheel. In some embodiments, a spring-loaded arm with a freewheeling roller may pivot open to allow the control cable installation/routing. The spring force may provide sufficient pressure on the control cable to provide reliable feeding by the outfeed wheel. A deflector may be positioned at the bottom of the cable handling system to direct the control cable away from the robot, such as away from the wheel or other moving parts of the robot. In some embodiments, deploying the control cable from the cable cartridge may include outfeeding the control cable between 10% and 20% faster than a ground speed of the robot. The gear train and routing may be similar to the gear train 704 and routing described above.

In Block 1506, process 1500 may include controlling the robot through the wired connection between the controller and the robot. For instance, a user or operator may provide one or more commands to the robot through the controller. The one or more commands may be sent to the robot over the control cable. For instance, the control cable may be a fiber optic cable, in which the commands are sent to the robot through one or more optic signals. The optic signals may be processed by one or more electronics housed within the cable handling system. For example, the optic signals may be processed by a PCB and converted to one or more electrical signals sent to the robot.

In Block 1508, process 1500 may include providing a slip clutch mechanism for allowing the cable handling system to selectively rotate relative to an attachment of the cable handling system to the robot during a slip event caused by an overload condition. For example, at least portions of the slip clutch mechanism may resiliently deform or flex to allow the cable handling system to rotate relative to the axle of the robot without causing permanent damage to the cable handling system. The overload condition may be a torque exceeding a threshold or break-away value, such as 250 inch-pounds, around 250 inch-pounds, or greater than 250 inch-pounds. In Block 1510, process 1500 may include resetting the cable handling system to its original position after the slip event occurs. For instance, the slip clutch mechanism may be rotated manually back to its pre-slip event position after the slip event occurs. The slip clutch mechanism may be similar to the slip clutch mechanism 900 described above.

In Block 1512, process 1500 may include replacing a used cable cartridge with a new cable cartridge. For example, once the control cable is fully dispensed from the cable cartridge, the cable cartridge may be removed and replaced with a fresh cable cartridge. In some embodiments, a used cable cartridge may be removed at the end of each mission or deployment of the robot, regardless of the amount of control cable dispensed from the cable cartridge. In this regard, the cable cartridge and control cable may be disposable items of the cable handling system.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A cable handling system for a robot, the cable handling system comprising:
- a base housing;
- a cable cartridge removably connected to the base housing;
- a control cable housed at least partially within the cable cartridge, the control cable deployable from the cable cartridge to maintain a wired connection between the robot and a controller;
- an outfeed assembly coupled to the base housing and configured to deploy the control cable from the cable cartridge, the outfeed assembly configured to couple to a drive mechanism of the robot, wherein the drive mechanism of the robot is controllable by the controller so as to move the robot in either of a forward direction and a reverse direction, wherein movement of the drive mechanism deploys the control cable from the cable cartridge, the outfeed assembly configured to deploy the control cable from the cable cartridge regardless of whether the drive mechanism of the robot causes the robot to move in the forward direction or in the reverse direction; and
- an attachment assembly configured to couple the cable handling system to the drive mechanism of the robot, the attachment assembly comprising:
  - a hub comprising a flange and a tube extending from the flange, the hub releasably attached to the base housing, a release assembly positioned at least partially within the tube, the release assembly movable between release and locking configurations, and wherein the tube and release assembly interface with the drive mechanism to releasably secure the cable handling system to the drive mechanism.

2. The cable handling system of claim 1, wherein the outfeed assembly comprises a drive hub for coupling to the drive mechanism of the robot, an outfeed wheel for deploying a length of the control cable, and a gear train configured to couple the outfeed wheel to the drive hub such that rotation of the drive hub rotates the outfeed wheel to deploy the control cable, the gear train comprising:

a first drive gear connected to the drive hub;

a first driven gear connected to the outfeed wheel, the first driven gear in meshing engagement with the first drive gear;

a second drive gear connected to the drive hub;

an idler gear in meshing engagement with the second drive gear; and a second driven gear connected to the outfeed wheel, the second driven gear in meshing engagement with the idler gear, wherein each of the first driven gear and the second driven gear is connected to the outfeed wheel with a one-way locking bearing such that the outfeed wheel spins in only one direction to deploy the control cable from the cable cartridge regardless of which direction the drive hub is rotated by the drive mechanism.

3. The cable handling system of claim 1, wherein the release assembly comprises:

a housing secured within the tube of the hub, the housing comprising a cavity defined at least partially by a bottom wall and an aperture defined through the bottom wall;

a button slidably positioned at least partially within the cavity of the housing, the button comprising an attachment portion extending through the aperture of the housing;

a spring configured to bias the button away from the bottom wall of the housing;

a plunger secured to the attachment portion of the button and slidably positioned within the tube of the hub; and a plurality of pawls slidably connected to a tapered portion of the plunger such that movement of the plunger away from the housing retracts the plurality of pawls into the tube and movement of the plunger towards the housing extends the plurality of pawls out of the tube.

4. The cable handling system of claim 3, further comprising a slip clutch mechanism integrated between the base housing and the attachment assembly to allow selective rotation of the base housing relative to the attachment assembly.

5. The cable handling system of claim 4, wherein the slip clutch mechanism comprises:

a plurality of pins extending from the flange of the hub; and an undulating surface defined in the base housing, the undulating surface comprising a series of alternating depressions and ridges that mate with the plurality of pins, wherein rotation of the base housing relative to the attachment assembly causes the plurality of pins to resiliently deform as the plurality of pins are configured to slide along the series of alternating depressions and ridges.

6. The cable handling system of claim 1, wherein the base housing comprises:

a first compartment configured to releasably receive the cable cartridge;

a second compartment housing one or more electronics configured to process a control signal received from the control cable; and a third compartment housing at least a portion of the outfeed assembly.

7. The cable handling system of claim 6, wherein:

the cable cartridge comprises a snap latch to snap fit the cable cartridge to the first compartment of the base housing;

the cable cartridge is designed for one-time use; and the control cable comprises a fiber optic cable.

8. A system comprising:

the cable handling system of claim 1;

the controller; and the robot, wherein the controller is configured to control the robot with signals sent to the robot over the control cable.

9. A method of operating the cable handling system of claim 1, the method comprising:

causing a wheel of the robot to rotate with one or more signals sent over a wired communication between a controller and the robot; and deploying a length of the control cable from the cable cartridge via the outfeed assembly as the wheel of the robot traverses across a surface, the control cable deployed from the cable cartridge regardless of a direction the wheel is rotated.

10. The cable handling system of claim 1, wherein:

the drive mechanism comprises a wheel, which, when rotated, causes the robot to move;

the outfeed assembly is driven with the wheel; and the outfeed assembly is coupled to the wheel of the robot such that movement of the wheel deploys the control cable from the disposable cable cartridge, the outfeed assembly deploying the control cable from the disposable cable cartridge regardless of which direction the wheel rotates.

11. A system comprising:

a controller;

a robot controllable by the controller, the robot comprising a drive mechanism operable to move the robot along a path in either of a forward direction and a reverse direction; and a cable handling system configured to provide a wired communication between the controller and the robot, the cable handling system comprising:

a base housing connected to the drive mechanism of the robot;

a disposable cable cartridge removably connected to the base housing;

a control cable housed at least partially within the disposable cable cartridge and connected between the controller and the robot; and an outfeed assembly coupled to the base housing, wherein:

the drive mechanism comprises a wheel, which, when rotated, causes the robot to move; and the outfeed assembly is coupled to the wheel of the robot such that movement of the wheel deploys the control cable from the disposable cable cartridge, the outfeed assembly deploying the control cable from the disposable cable cartridge regardless of which direction the wheel rotates.

12. The system of claim 11, wherein the outfeed assembly comprises:

an outfeed wheel configured to deploy the control cable from the disposable cable cartridge; and a gear train configured to link the outfeed wheel to the drive mechanism, such that the drive mechanism is configured to rotate the outfeed wheel to deploy the control cable regardless of whether the drive mechanism of the robot causes the robot to move in the forward direction or in the reverse direction.

13. The system of claim 11, wherein:

the drive mechanism comprises an axle coupled to the wheel; and the base housing is coupled to the axle of the drive mechanism.

14. The system of claim 11, wherein the base housing comprises a routing arrangement to control deployment of the control cable from the disposable cable cartridge, the routing arrangement comprising:

one or more cable guides configured to direct the control cable to the outfeed assembly;

a retainer configured to couple the control cable to the outfeed assembly, the retainer comprising a spring-loaded arm with a freewheeling roller that presses the control cable against the outfeed assembly; and a deflector configured to direct the control cable away from the drive mechanism.

15. A method of operating the system of claim 11, the method comprising:

controlling the robot using the controller; and deploying a length of the control cable from the disposable cable cartridge via the outfeed assembly as the robot is moved along the path across a surface, the control cable deployed from the disposable cable cartridge regardless of a direction the robot is moved along the path across the surface.

16. A method comprising:

providing a wired communication between a robot and a controller with a cable handling system, the cable handling system comprising:

a cable cartridge;

a control cable housed at least partially within the cable cartridge and connected between the controller and the robot; and, an outfeed assembly; and rotating a wheel of the robot to rotate with one or more signals sent over the wired communication to move the robot in either of a forward direction and a reverse direction according to a direction the wheel is rotated, wherein rotating the wheel causes the outfeed assembly to deploy the control cable regardless of the direction the wheel is rotated.

17. The method of claim 16, further comprising:

allowing, with a slip clutch mechanism, the cable handling system to selectively rotate relative to an attachment of the cable handling system during a slip event caused by an overload condition; and resetting the cable handling system to its original position after the slip event.

18. The method of claim 16, wherein the cable handling system is releasably attached to an axle of the robot, and wherein the method further comprises replacing a used cable cartridge with a new cable cartridge.

19. The method of claim 16, further comprising controlling the robot through the wired communication between the controller and the robot.

20. A system operable to perform the method of claim 16, the system comprising:

the controller, wherein the controller is configured to control the robot, and wherein the wheel is operable to move the robot along a path; and the cable handling system, wherein the cable handling system comprises:

a base housing coupled to the wheel of the robot;

the cable cartridge, wherein the cable cartridge is disposable and is removably coupled to the base housing;

the control cable; and the outfeed assembly, wherein the outfeed assembly is coupled to the wheel of the robot to deploy the control cable from the cable cartridge.

* * * * *